July 16, 1968   L. E. MOORE   3,392,802
TREE SEAT

Filed April 4, 1967   2 Sheets-Sheet 1

Lloyd E. Moore
INVENTOR.

July 16, 1968
L. E. MOORE
3,392,802
TREE SEAT
Filed April 4, 1967
2 Sheets-Sheet 2
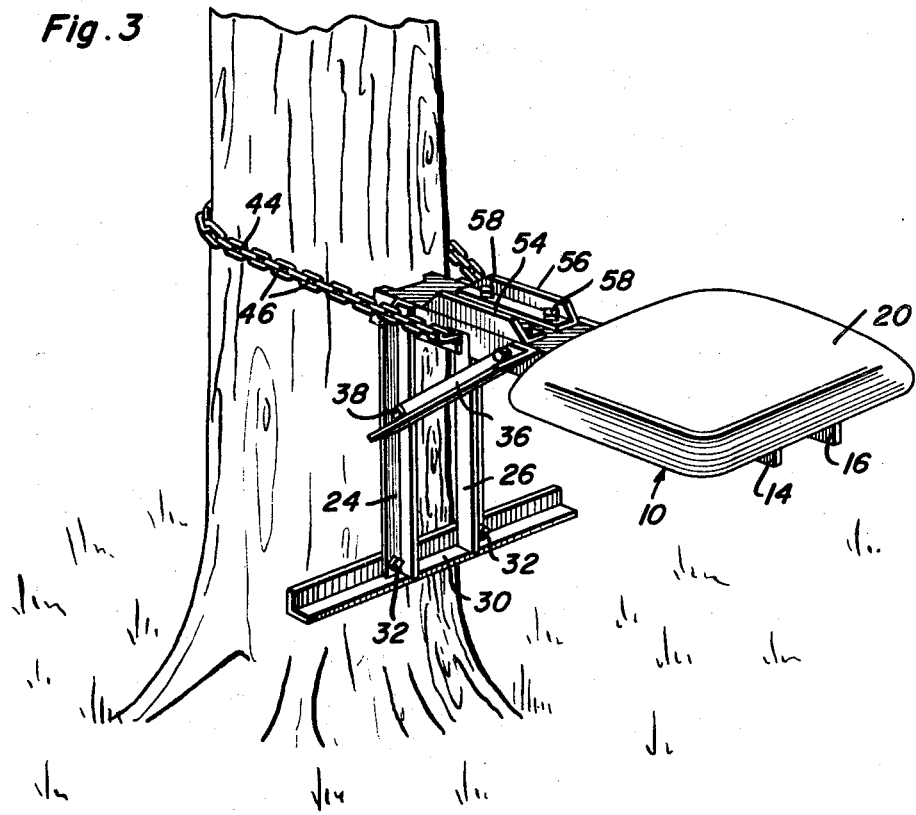
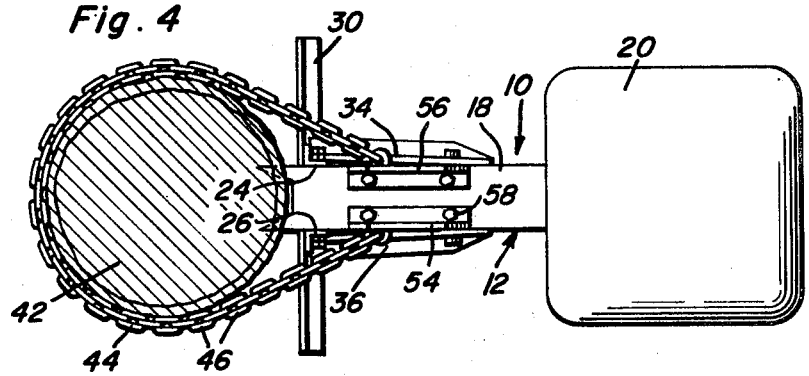
Lloyd E. Moore
INVENTOR.
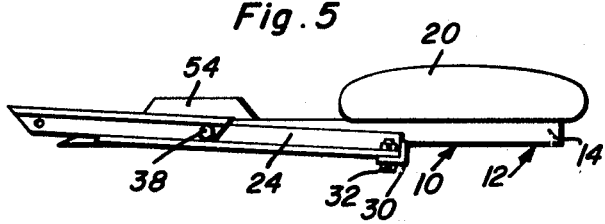

United States Patent Office 3,392,802
Patented July 16, 1968

3,392,802
TREE SEAT
Lloyd E. Moore, 825 Navajo Trail,
Shreveport, La. 71107
Filed Apr. 4, 1967, Ser. No. 628,377
9 Claims. (Cl. 182—187)

ABSTRACT OF THE DISCLOSURE

A seat construction which may be folded into a compact condition for ease in storage and transportation from one location to another and constructed in a manner so as to be readily engageable with a tree trunk or the like to provide a horizontally outwardly projecting seat-defining member supported from the tree trunk completely independent of any partial support from any other support means.

---

The tree seat of the instant invention includes an elongated horizontal support arm provided with upwardly facing seat defining means at one end and depending prop means including a lower end portion disposed beneath the other end of the arm and adapted to abut the trunk of a tree against which the second-mentioned end of the arm is abutted, the tree seat also including elongated flexible and adjustable tension loop means having one end portion attached to the arm intermediate its opposite ends and adapted at its other end portion to be looped around the trunk of the associated tree.

By this construction the tree seat of the instant invention may be readily engaged with and supported entirely from a preselected tree trunk in a manner such that a hunter or nature observer may be supported from the seat-defining portion of the tree seat in elevated position above the ground and in a position fully concealed behind the side of the associated tree trunk against which the elongated arm of the seat is abutted.

The main object of this invention is to provide a tree seat which will be capable of supporting a hunter or nature observer in an elevated position on the trunk of a tree with the person utilizing the seat being comfortably positioned and substantially concealed from view from the opposite side of the associated tree trunk.

Another object of this invention is to provide a tree seat in accordance with the preceding object and constructed in a manner whereby the tree seat may be readily folded into a compact state for ease in handling and convenient storage.

A final object of this invention to be specifically enumerated herein is to provide a tree seat which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a perspective view of the tree seat fully seatingly engaged with an associated tree trunk;

FIGURE 4 is a horizontal sectional view taken substantially upon a plane passing through the trunk of the tree of FIGURE 3 and spaced slightly above the tree seat; and FIGURE 5 is a side elevational view of the tree seat in a folded position for ease in handling and compact storage.

Figure 1:
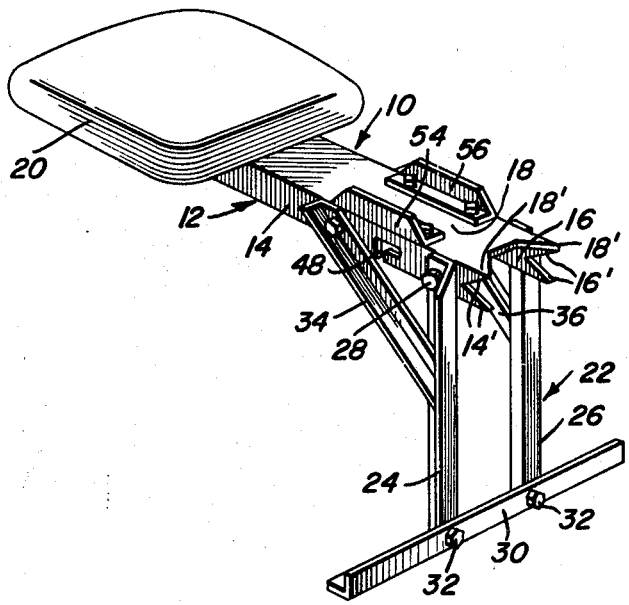
FIGURE 1 is a perspective view of the tree seat of the instant invention.

Referring now more specifically to the drawings the numeral 10 generally designates the tree seat of the instant invention. The seat 10 includes an elongated horizontal support arm referred to in general by the reference numeral 12 and comprising a horizontally disposed and inverted channel-shaped member including a pair of opposite longitudinal upstanding flanges 14 and 16 interconnected by means of an upper bight or web portion 18.

One end of the support arm 12 has an upwardly facing seat 20 secured thereto and a depending prop assembly generally referred to by the reference numeral 22 is carried by the other end of the support arm. The prop assembly 22 includes a pair of laterally spaced parallel angle members 24 and 26 whose upper ends are pivotally secured to the flanges 14 and 16, respectively, by means of suitable pivot fasteners 28. The lower ends of the angle members 24 and 26 are interconnected by means of a transverse horizontal brace member whose opposite ends project outwardly beyond the remote sides of the angle members 24 and 26 and which is secured to the lower ends of the angle members by means of suitable fasteners 32.

The prop assembly 22 includes a pair of diagonal bracing arms 34 and 36 which generally parallel each other and have one pair of corresponding ends thereof pivotally secured to the angle members 24 and 26, respectively, intermediate their upper and lower ends by means of suitable fasteners 38. The other upper ends of the diagonal bracing members 34 and 36 are secured to the flanges 14 and 16, respectively, by means of suitable fasteners 40. The fasteners 40 are removable and the diagonal bracing members 34 and 36 may therefore have their corresponding ends swung toward and over the fasteners 28 prior to the angle members 24 and 26 and brace member 30 being swung toward positions overlying the flanges 14 and 16 and disposed beneath the seat 20, respectively. When the seat 10 is thus collapsed in the manner illustrated in FIGURE 5 of the drawings, it may be readily transported from one location to another and stored in a compact state.

Figure 2:
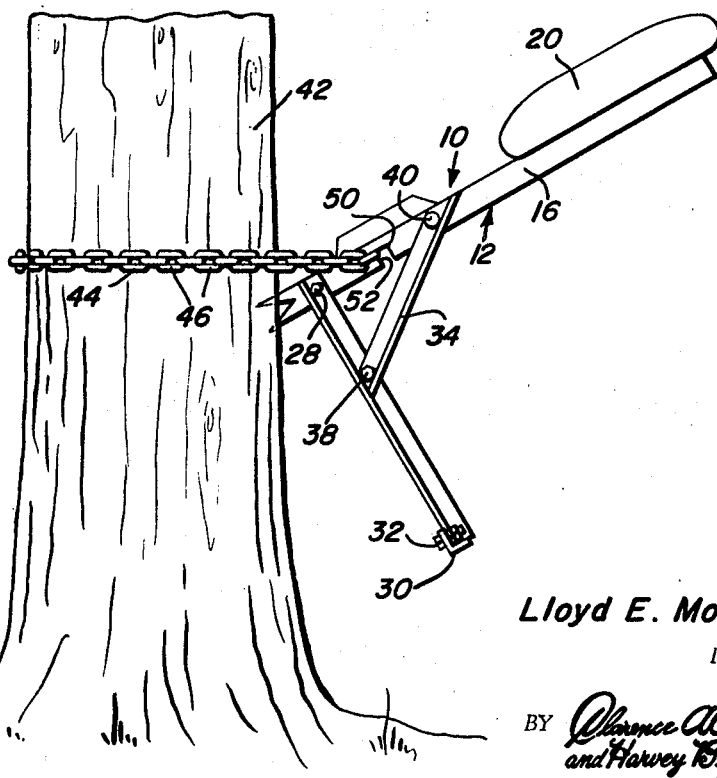
FIGURE 2 is a side elevational view of the tree seat operatively supported from an associated tree trunk but in its position initially engaged with the tree trunk and prior to the tree seat being pivoted downwardly at its free end into full seated engagement with the tree trunk.

However, the end of the support arm 12 remote from the seat 20 includes integral portions 14' and 16' of the flanges 14 and 16 together with coacting portions 18' of the web or bight portion 18 which form barbs projecting outwardly of the corresponding end of the support arm 12 and adapted to be embedded in the tree trunk 42. In addition, an elongated flexible tension member 44 is provided and is in the form of a length of link chain including a plurality of pivotally interconnected links 46. The tension member 44 is arranged to form a loop extending about the tree trunk 42 and the opposite end portions of the tension member 44 have selected links 46 thereof passed through corresponding horizontal leg portions 48 of slots 50 formed in the flanges 14 and 16 and including vertical entrance leg portions 52. In this manner, the size of the loop formed by the tension member may be readily adjusted so as to conform to the diameter of the tree trunk 42 and after the opposite end portions of the tension member 44 have been engaged in the slots 50, the seat 10 may be positioned in the manner illustrated in FIGURE 2 of the drawings with the barbs 14', 16' and 18' engaged with the tree trunk 42 prior to the free end portion of the support arm 12 from which the seat 20 is supported being swung downwardly to the position thereof illustrated in FIGURE 3 of the drawings. Such swinging movement of the support arm 12 from the position thereof illustrated in FIGURE 2 of the drawings to the position illustrated in FIGURE 3 will of course cause the barbs 14′, 16′ and 18′ to be further embedded in the tree trunk so as to prevent the seat 10 from shifting vertically along the tree trunk 42.

The opposite end portions of the brace member 30 provide footrests for a person disposed astraddle the seat 20 and facing the tree trunk 42. In this manner, a person may be supported from the seat 10 in an unobtrusive manner and out of sight by persons approaching the seat 10 from the side of the tree trunk 42 remote from the seat 10. The seat 10 is adapted to support hunters in an elevated position above the ground and may also be used by bird watchers and other persons wishing to be provided an elevated seat in an unobtrusive location.

The slots 50 are of course inverted L-shaped in configuration and the formation of the slots 50 in the flanges 14 and 16 may have a tendency to weaken the latter. Accordingly, a pair of opposite side elongated and longitudinally extending angle braces 54 and 56 extend along opposite side portions of the upper surface of the bight or web portion 18 and are secured to the latter by means of suitable fasteners 58 so as to strengthen the portions of the support arm 12 in which the slots 50 are formed.

Of course, the plane in which the tension member or loop 44 is disposed may be slightly downwardly inclined toward the support arm 12 and the brace member 30 is adapted to engage the tree trunk 42 centrally intermediate the opposite ends of the brace member 30. In addition, it is contemplated that the channel member 12 and the members 24, 26, 30, 34 and 36 may be constructed of any suitable material such as iron or aluminum.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tree seat comprising elongated horizontal support arm means including upwardly facing seat defining means at one end, depending elongated prop means carried by said arm means and including a lower end portion disposed beneath the other end of said arm means and adapted to abut a trunk of a tree against which said other end of said arm means is abutted, and elongated, flexible and adjustable tension loop means having one end portion thereof attached to said arm means intermediate the opposite ends thereof and adapted, at its other end portion, to be looped about said trunk, the upper end of said depending prop means being pivotally secured to said other end portion of said arm means for rotation relative thereto about a horizontal axis extending transversely of said prop means and said arm means, and elongated diagonal brace means pivotally secured, at one end, to said prop at a point below said axis removably secured, at the other end, to said arm means at a point spaced toward said one end portion thereof from said axis, said prop means and said brace means, when said brace means is released from securement to said arm means, being pivotable to positions generally paralleling said arm means and said prop means, respectively.

2. The combination of claim 1 wherein said other end of said arm means includes endwise outwardly projecting barb means adapted to be at least partially embedded in said trunk.

3. The combination of claim 1 wherein said arm means, at said other end thereof, is defined by an inverted channel-shaped member extending longitudinally of said arm means, said channel-shaped member including an upper generally horizontal web portion and a pair of opposite side depending flanges, said flanges including inverted generally L-shaped slots provided with lower upstanding leg portions opening outwardly downwardly through the lower edge portions of said flanges and upper leg portions extending longitudinally of said arm means and opening, at their ends adjacent said one end of said arm means, into the upper ends of said upstanding leg portions, said tension loop means comprising a length of link chain including opposite end links extending through said upper leg portions of said slots.

4. The combination of claim 1 wherein said prop means includes a pair of elongated members between whose upper ends said arm means is received and said diagonal brace means includes a pair of elongated bracing arms pivotally secured at one pair of corresponding ends to the remote side portions of said elongated members and releasably secured to the remote side portions of said arm means at the other pair of corresponding ends thereof.

5. The combination of claim 4 wherein said arm means, at said other end thereof, is defined by an inverted channel-shaped member extending longitudinally of said arm means, said channel-shaped member including an upper generally horizontal web portion and a pair of opposite side depending flanges, said flanges including inverted generally L-shaped slots provided with lower upstanding leg portions opening outwardly downwardly through the lower edge portions of said flanges and upper leg portions extending longitudinally of said arm means and opening, at their ends adjacent said one end of said arm means, into the upper ends of said upstanding leg portions, said tension loop means comprising a length of link chain including opposite end links extending through said upper leg portions of said slots.

6. The combination of claim 5 wherein said other end of said arm means includes endwise outwardly projecting barb means adapted to be at least partially embedded in said trunk.

7. The combination of claim 1 wherein said arm means, at said other end thereof, is defined by an inverted channel-shaped member extending longitudinally of said arm means, said channel-shaped member including an upper generally horizontal web portion and a pair of opposite side depending flanges, said flanges including inverted generally L-shaped slots provided with lower upstanding leg portions opening outwardly downwardly through the lower edge portions of said flanges and upper leg portions extending longitudinally of said arm means and opening, at their ends adjacent said one end of said arm means, into the upper ends of said upstanding leg portions, said tension loop means comprising a length of link chain including opposite end links extending through said upper leg portions of said slots, said channel-shaped member including elongated longitudinally extending bracing means overlying and secured to the opposite side portions of said web portion disposed on opposite sides of an upstanding plane extending transversely of said channel-shaped member and through said slots.

8. The combination of claim 1 wherein said arm means, at said other end thereof, is defined by an inverted channel-shaped member extending longitudinally of said arm means, said channel-shaped member including an upper generally horizontal web portion and a pair of opposite side depending flanges, said flanges including inverted generally L-shaped slots provided with lower upstanding leg portions opening outwardly downwardly through the lower edge portions of said flanges and upper leg portions extending longitudinally of said arm means and opening, at their ends adjacent said one end of said arm means, into the upper ends of said upstanding leg portions, said tension loop means comprising a length of link chain including opposite end links extending through said upper leg portions of said slots, said other end of said arm means including endwise outwardly projecting barb means adapted to be at least partially embedded in said trunk, and comprising integral extensions of the corresponding ends of said flanges.

9. A tree seat structure comprising elongated horizontal arm means including upwardly facing seat defining means at one end, depending elongated prop means carried by said arm means and including a lower end portion disposed beneath the other end of said arm means and adapted to abut the trunk of a tree against which said other end of said arm means is abutted, elongated, flexible and adjustable loop means having one end portion attached to said seat structure adjacent said other end of said arm means and adapted at its other end portion, to be looped about said trunk and removably secured to said seat structure adjacent said other end of said arm means, said prop means comprising a pair of upstanding elongated members secured at their upper ends to and spaced transversely of said other end of said arm means, a pair of generally parallel diagonal brace members secured at one pair of corresponding ends to said upstanding members below said other end of said arm means and at the other pair of corresponding ends to corresponding side portions of said arm means at points spaced from said other end thereof, said lower end portion of said prop means including an elongated transverse brace member secured and extending between the lower ends of said upstanding members and including opposite end portions projecting outwardly beyond remote sides of said upstanding members defining foot rests for a person seated on said seat defining means and facing said trunk.

References Cited

UNITED STATES PATENTS

| | | | |
|---|---|---|---|
| 852,623 | 5/1907 | Roth | 182—187 XR |
| 1,187,078 | 6/1916 | May | 182—187 |
| 1,158,173 | 10/1915 | Carpentier | 182—187 |
| 1,185,404 | 5/1916 | Hughes et al. | 182—187 |
| 1,206,574 | 11/1916 | Miller | 182—187 |
| 2,394,203 | 2/1946 | Pruder | 182—187 XR |
| 2,964,200 | 12/1960 | King | 108—135 |
| 3,116,808 | 1/1964 | Riley | 182—187 XR |
| 3,148,857 | 9/1964 | Hutchison | 182—187 XR |

BOBBY R. GAY, *Primary Examiner.*

GLENN O. FINCH, *Assistant Examiner.*